Figure 4:
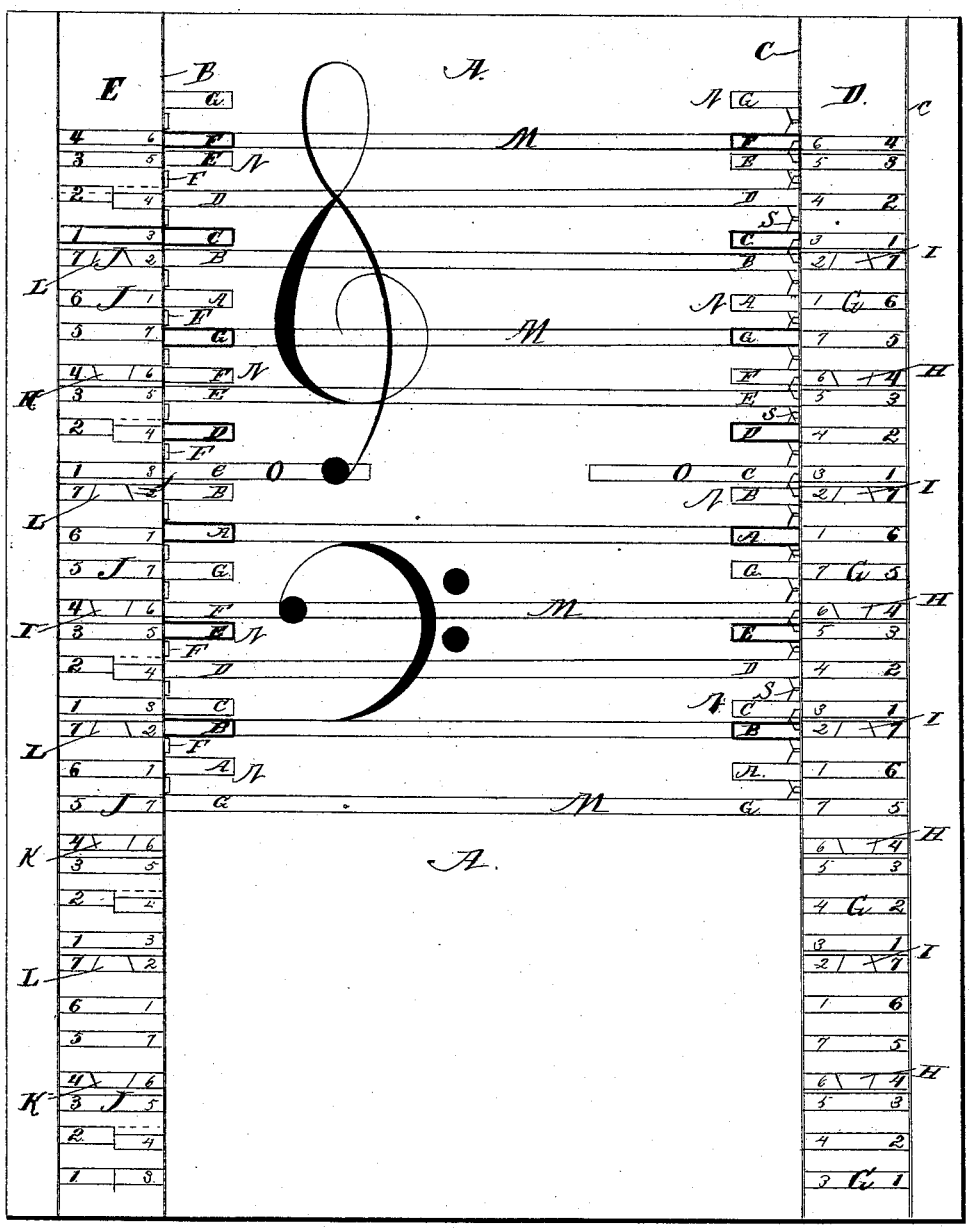

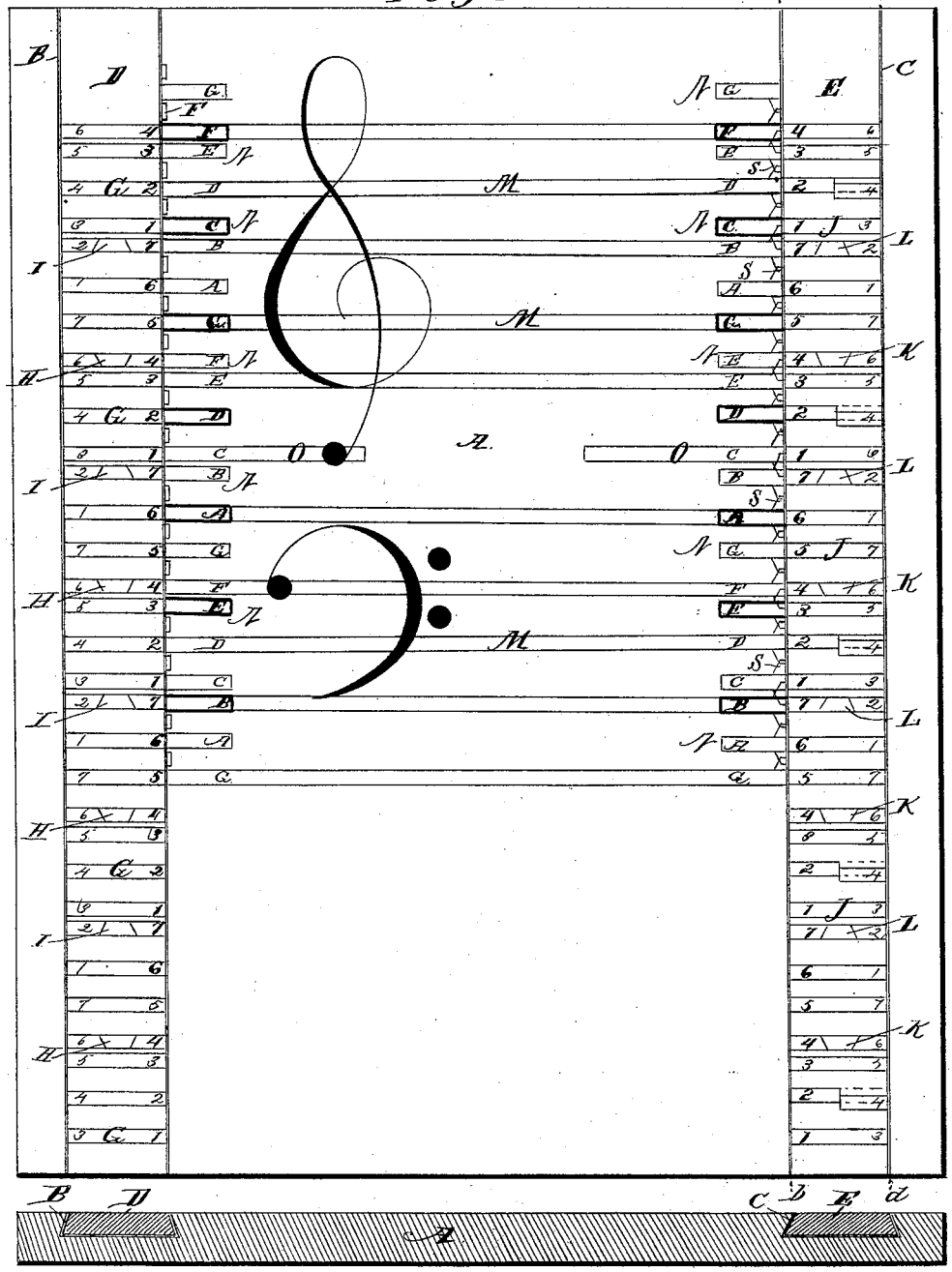

(No Model.) 3 Sheets—Sheet 2.
R. NIX.
DEVICE FOR TEACHING MUSIC.
No. 367,156. Patented July 26, 1887.
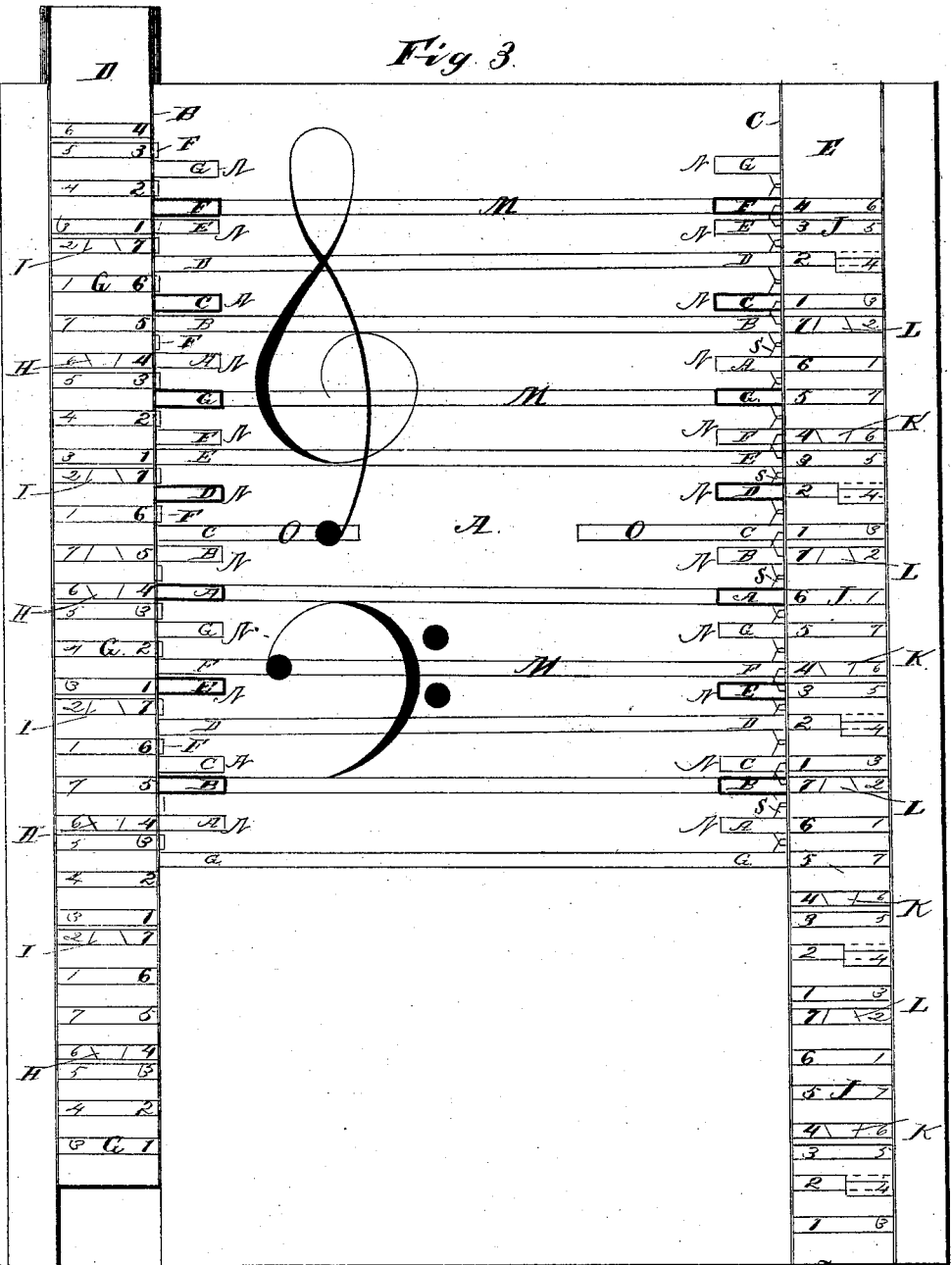

(No Model.)  3 Sheets—Sheet 3.

R. NIX.
DEVICE FOR TEACHING MUSIC.

No. 367,156.  Patented July 26, 1887.

Witnesses  
Geo. Thorpe.  
A. W. Bishop.

Inventor  
Robert Nix  
By his Attorneys  
C. A. Snow & Co.

UNITED STATES PATENT OFFICE.

ROBERT NIX, OF NEW ULM, MINNESOTA.

DEVICE FOR TEACHING MUSIC.

SPECIFICATION forming part of Letters Patent No. 367,156, dated July 26, 1887.

Application filed June 2, 1887. Serial No. 240,063. (No model.)

*To all whom it may concern:*

Be it known that I, ROBERT NIX, a citizen of the United States, residing at New Ulm, in the county of Brown and State of Minnesota, have invented new and useful Improvements in Devices for Teaching the Rudiments of Music, of which the following is a specification.

My invention relates to improvements in devices for teaching the rudiments of music; and its primary object is to provide a simple and efficient device whereby the staff notation, the transposition of keys, the lengths of intervals, and the relative major and minor keys may be taught by visual aids in a manner to be readily comprehended by the pupil.

To this end my invention consists in a certain peculiar representation of the musical staff, in the provision of certain movable diagrams to be used in connection with the said representation of the staff, and in the method of operating the same, all of which will be hereinafter first fully described, and then pointed out in the claims.

In the accompanying drawings, Figure 1 is a plan view of a device constructed in accordance with and embodying my invention. Fig. 2 is a cross-section of the same. Fig. 3 is a plan view showing the method of using the device to determine the signature of a given key, and Fig. 4 is a plan view showing the two slides interchanged.

Referring to the drawings by letter, A designates a board, chart, or other similar device, provided, near its opposite side edges, with the grooves B C, and D and E designate slides which are fitted in and movable longitudinally along the grooves B C, respectively.

Upon the face of the board A, I provide the representation of a staff, as shown. Upon the slide D, I provide a diagram representing the intervals employed in equal temperament, and upon the slide E in the same manner I represent the intervals of the true or theoretical scale.

In carrying out my invention I secure the slides D E against movement in the grooves B C, and then mark out upon them the proper points, at equal distances apart, to designate the octaves. I then mark upon the slide D the proper points to designate the intermediate intervals—viz., the tones and semi-tones, or, as they are sometimes called, the "steps" and "half-steps"—and these points are so placed that the spaces designating the semi-tones will be exactly one-half the size or width of the spaces designating the tones.

Above the fifth line of the diagram representing the second octave on the slide D, I provide along the inner side edge of the groove B on the board A a series of arbitrary symbols, which are so arranged that each one of the series will be midway between two points or lines, which define a space designating a tone. In the present instance I have shown a series of rectangles, F.

Straight lines G are drawn across the slide, to clearly define the spaces which indicate the tone-intervals, and these are made broad, as shown, one-half their thickness being on each side of the points before laid off on the slide to designate their position. These lines are then consecutively numbered from the bottom upward in two series, as shown, the bottom line being numbered with a bold 1 at one end and a light 3 at the opposite end. The next line above is numbered with a bold 2 and a light 4, and so on upward, each series always stopping at 7, and the next line above being numbered 1. Each line, also, which is numbered with a bold 4 has marked on it a trapezoid, H, having its upper base greater than its lower base, and each line which is numbered with a bold 7 has marked on it a trapezoid, I, having its lower base greater than its upper base, as shown.

The diagram marked upon the slide E, representing the intervals of the true scale, is somewhat different from that upon the slide D, just described, which represents the intervals of equal temperament. In making this diagram, I first mark off along the inner edge of the slide, indicated in Fig. 1 by the line *a b*, the distances which, based on the same unit of measure as that employed in marking out the diagram on the slide D, will indicate the intervals of the major scale, and along the outer edge of the slide E, indicated by the line *c d*, I mark off the distances which indicate the intervals of the relative minor scale. I then connect these points by straight lines J, and number said lines in the same manner as the straight lines on the slide D, and I also provide trapezoids K L on this slide in the same relative position as the trapezoids H I, respectively, on the slide D. The lines of the staff are next drawn on the board A by connecting the lines of the slide D with the lines of the slide E bearing the same bold figure, the lines M, which are thereby made to occupy the position (relatively speaking) usually occupied by the lines of the ordinary staff, being extended across the entire face of the board between the two sides, and the lines N, which would occupy the place of the usual spaces, being extended only a short distance inward from each slide, while the line O, indicating the position of middle C, extends about one-third the distance across the space between the slides. These lines are all lettered consecutively from the bottom upward with the letters of the musical alphabet, as clearly shown. It will be observed that when the staff is constructed in this manner the lines, instead of being equal distances apart, as is usual, will be at such distances apart as will indicate the intervals of the scale of C major. Counting by fourths from above, I make the lines indicating the position of the letters on the staff somewhat bolder than the other lines, so that, reading from above, the lines indicating the position of the following letters will be somewhat prominent, F C G D A E B. Along the inner edge of the slide E, between the lines of the staff, I provide an arbitrary symbol or representation, S, that shown in the present instance being trapezoids with their smaller bases overlapping between the lines of the staff. These trapezoids S indicate the interval of a chromatic semitone, while the interval of a diatonic semitone is indicated by the distance between the centers of any two adjacent lines on the slides E. (Marked boldly 3 and 4, or 7 and 1.) The relative intervals of a comma, the major tone, and the minor tone can be readily seen by examining the slide E. The construction of the diagrams being thus completed, the proper clefs are placed on the staff, and the slides are released so that they can be moved along the grooves.

The fundamental position of the several parts of the device is that shown in Fig. 1, in which they are arranged to represent the signature, tones, and intervals of the key of C major and its relative minor key. If it be desired to find the signature of any given key, the slide D is moved upwardly until the line marked with bold 1 is in alignment with the line of staff, marked with the tonic of the key, the signature of which is to be found. The signature can then be read by noting the letters on the staff that are out of alignment with the lines of the slide, and the minor key will be shown by the lines of the staff which align with the light numbers on the slide. Thus, for example, suppose it be desired to find the signature of the key of E. The slide is moved along the board until the line marked with bold 1 comes into alignment with the line of the staff lettered E. It will be seen that every bold 2 is a semitone higher than F, every 7 a semitone higher than D, every 6 a semitone higher than C, and every 3 a semitone higher than G. Consequently all these letters must be sharped, and the order in which the sharps must be written is determined by reading the letters to be sharped on the bolder lines from the top of the scale downward. The order in which the present signature is to be written is thus found to be F C G D. The position of the sharps on the staff is determined by writing them in the above order on the highest lines and in the highest spaces of the staff that represent the tones to be sharped. It will be also readily seen, by finding the position of the line on the slide numbered light 1, that the relative minor key to E major is the key of C sharp minor. This use of the device will be readily understood upon reference to Fig. 3. If the signature of the key be in flats, it is determined in the same manner with the exception that the letters are read from the bottom upward. If the number of sharps or flats be given, the key may be readily determined by the reverse operation.

The slide E can be used to solve the problems solved by the use of the slide D, and in addition can be used to determine the ratio of vibration of the tones of a given key, and also the ratio of vibration of the relative minor key. The diagram on the slide indicates the value of the comma on the lines marked with bold 6 and bold 2, and also indicates the value of the diatonic and chromatic tones. By placing the slide so that the bold 1 comes in alignment with the line of the staff indicating the base or tonic of the key the ratio of vibration of any tone can be easily determined by multiplying the ratio of vibration of the tonic by the value of the given tone as indicated by the slide.

The error of equal temperament can be plainly illustrated by interchanging the slides, as shown in Fig. 4, when it will be found that the lines of the slides indicating octaves will align with the octaves of the staff, but the other lines will be out of alignment.

The staff may, if desired, have the customary position of the sharps and flats indicated thereon; but this is not an essential feature of my invention.

I have shown and described my device as composed of a board and slides working in grooves in the boards; but various modifications may be made therein, and it may be embodied in blackboards, charts, books, and numerous other forms.

Having thus fully described my invention, what I claim, and desire to secure by Letters Patent, is—

1. A device for aid in teaching music, having a representation of the staff, comprising a series of lines and intermediate shorter lines in the spaces between said lines, all of the lines being arranged at distances apart corresponding to the tone-intervals, substantially as specified.

2. A device for teaching music, comprising an immovable portion having a diagrammatic representation of the staff and a movable portion having a representation of intervals of equal temperament, substantially as and for the purposes set forth.

3. A device for teaching music, comprising an immovable portion having a representation of the staff and a movable portion having a representation of the true intervals of the major and minor scales, substantially as set forth.

4. A device for teaching music, comprising a base having a representation of the staff and slides movable along the opposite edges of the base, one of said slides having a diagrammatic representation of the intervals of equal temperament, and the other having a diagrammatic representation of the true intervals of the major and minor scales, substantially as set forth.

5. A device for teaching music, having a representation of the staff in which the lines are placed at distances apart corresponding to the intervals between the tones indicated by said lines, the semi-tones being indicated by arbitrary symbols arranged along the edge of the staff, substantially as specified.

In testimony that I claim the foregoing as my own I have hereto affixed my signature in presence of two witnesses.

ROBERT NIX.

Witnesses:
  E. G. KOCH,
  JOS. A. ECKSTEIN.